Oct. 15, 1968 S. J. MEHLMAN 3,406,343

PM/AM MULTIPLEX COMMUNICATION

Filed July 1, 1965 4 Sheets-Sheet 1

INVENTOR.
SAMUEL J. MEHLMAN
BY
Edward J Norton
Attorney

PM/AM MULTIPLEX COMMUNICATION

Filed July 1, 1965 4 Sheets-Sheet 2

INVENTOR.
SAMUEL J. MEHLMAN
BY
Edward J. Norton
Attorney

INVENTOR.
SAMUEL J. MEHLMAN
BY
Edward J. Norton
Attorney

INVENTOR.
SAMUEL J. MEHLMAN
BY
Edward J Norton
Attorney

United States Patent Office
3,406,343
Patented Oct. 15, 1968

3,406,343
PM/AM MULTIPLEX COMMUNICATION
Samuel J. Mehlman, Jericho, N.Y., assignor to Radio Corporation of America, a corporation of Delaware
Filed July 1, 1965, Ser. No. 468,697
15 Claims. (Cl. 325—40)

ABSTRACT OF THE DISCLOSURE

A cycle of a given wave is phased modulated to indicate a mark pulse by reversing the phase of the given wave at the middle of the cycle thereof, and to indicate a space by making no change in the cycle of the given wave. A cycle of the given wave is also amplitude modulated by changing the amplitude of the cycle to indicate a mark pulse and by not changing the amplitude of the cycle to indicate a space. To keep the average amplitude of the doubly modulated wave at zero, the wave cycles that are phased modulated and the wave cycles that are amplitude modulated differ by an odd number of half cycles of the given wave.

This invention relates to multiplex, pulse modulation communication systems, and, more particularly, to an improved communication system wherein each cycle of a carrier wave is both phase and amplitude modulated, and to a system for demodulating the so-modulated wave.

The usefulness of a signal channel can be increased by increasing the amount of information per given time interval sent over the channel. If the frequency band width of a channel over which increased amounts of information are to be sent is limited, the amount of information that can be transmitted over the channel must be increased without producing a substantial amount of signal energy at frequencies outside the frequency band of the channel. Otherwise, the received signal having lost signal energy at the frequencies outside the band, will not be an accurate reproduction of the signal applied to the channel. It has been discovered that the amount of information that can be transmitted per time interval over a transmission channel can be increased, without increasing the required band width, by pulse modulation techniques, including both pulse amplitude and pulse phase modulation. By using the amplitude of transmitted pulses to indicate both amplitude and phase modulation, the amount of information carried by a channel can be increased and still provide acceptable reproduction of the original signals.

It is an object of this invention to provide an improved system of communication for increasing the amount of information that can be transmitted over a given communication channel.

It is a further object of this invention to provide an improved combined pulse amplitude and pulse phase modulator.

It is a still further object of this invention to provide an improved demodulator of a wave which is pulse-modulated both in phase and amplitude.

Another object of this invention is to provide a system of communication including a transmitter for both pulse amplitude and pulse phase modulating each cycle of a wave and a receiver for demodulating the transmitted wave.

In accordance with one embodiment of this invention, means are provided for producing a communication signal including a plurality of equally spaced bauds or signal intervals of equal time duration. A pulse occurring during a baud comprises a mark, and lack of a pulse during a baud comprises a space. The bauds are alternately applied to two paths. A square wave is applied 180° out of phase to the two paths, the period of the square wave being equal to twice the length of a baud. The phase of the square wave applied to one path is reversed each time a baud including a mark is applied to that path, but no phase change occurs when a baud including a space is applied to that one path, whereby a phase modulated square wave is produced. The amplitude of the phase modulated square wave is changed when a baud the phase modulated square wave is changed when a baud including a mark is applied to the other path, but the amplitude of the phase modulated square wave is not changed when a baud including a space is applied to the other path. The amplitude modulation may be applied to the square wave after a delay of an odd number of ½ cycles thereof, to assist in providing a zero average direct current level of the resulting phase and amplitude modulated wave. The marks and spaces can originally be produced by sampling an analogue wave. A mark is produced when the analogue wave exceeds a predetermined amplitude during a baud, and no response and therefore a space is produced when the analogue wave does not exceed the said predetermined amplitude during another baud.

If desired, the doubly modulated wave can be sent through a low-phase filter to take off the sharp corners of the square wave before applying the wave to an existent transmission channel, or the channel itself may remove the high frequency represented by the corners of the square wave.

The phase and amplitude modulated wave is demodulated after transmission. Since the amplitude of only two points in each cycle of the transmitted wave indicates both phase and amplitude modulation, the phase and amplitude modulated waves do not require a substantially greater band width for transmission than a wave that is either pulse amplitude modulated or pulse phase modulated, whereby according to the system of this invention, twice as much information can be sent over an existent channel than can be sent over this channel by prior art systems.

The novel features of this invention, both as to its organization and method of operation as well as additional objects and advantages thereof, will be understood more readily from the following description, when read in conjunction with the accompanying drawings in which.

Figure 1:
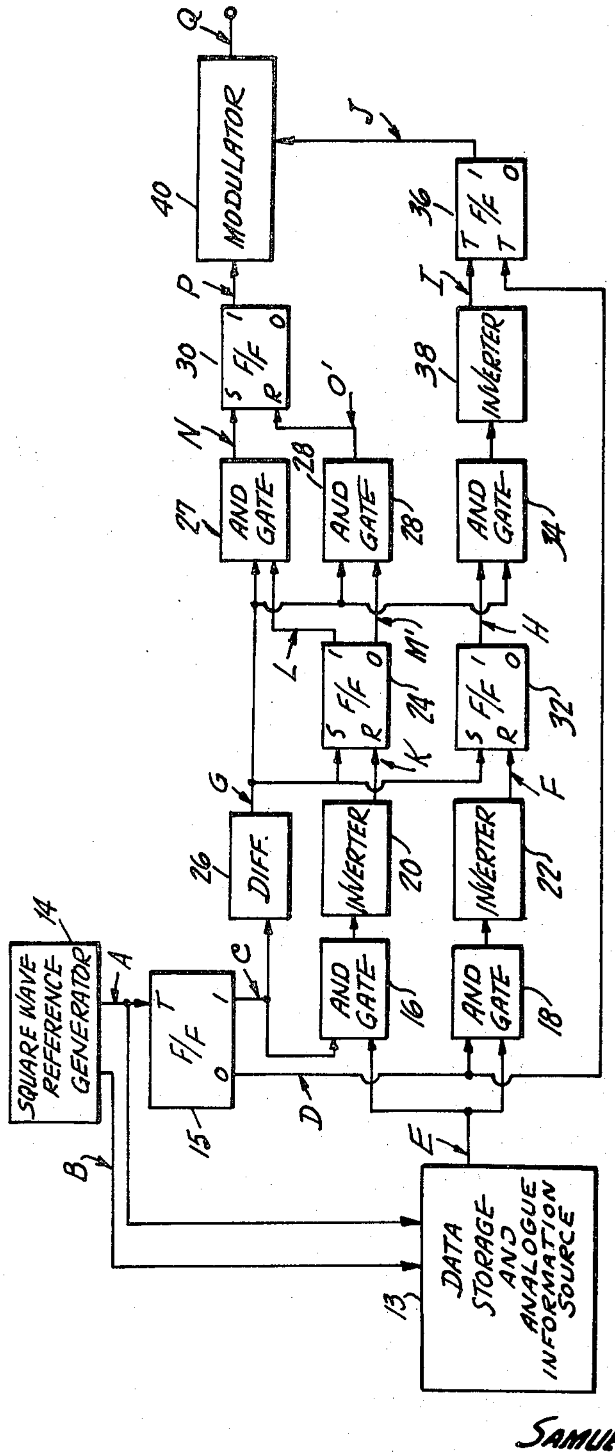
FIG. 1 is a block diagram of one embodiment of a transmitter or modulator of this invention.
Figure 2:
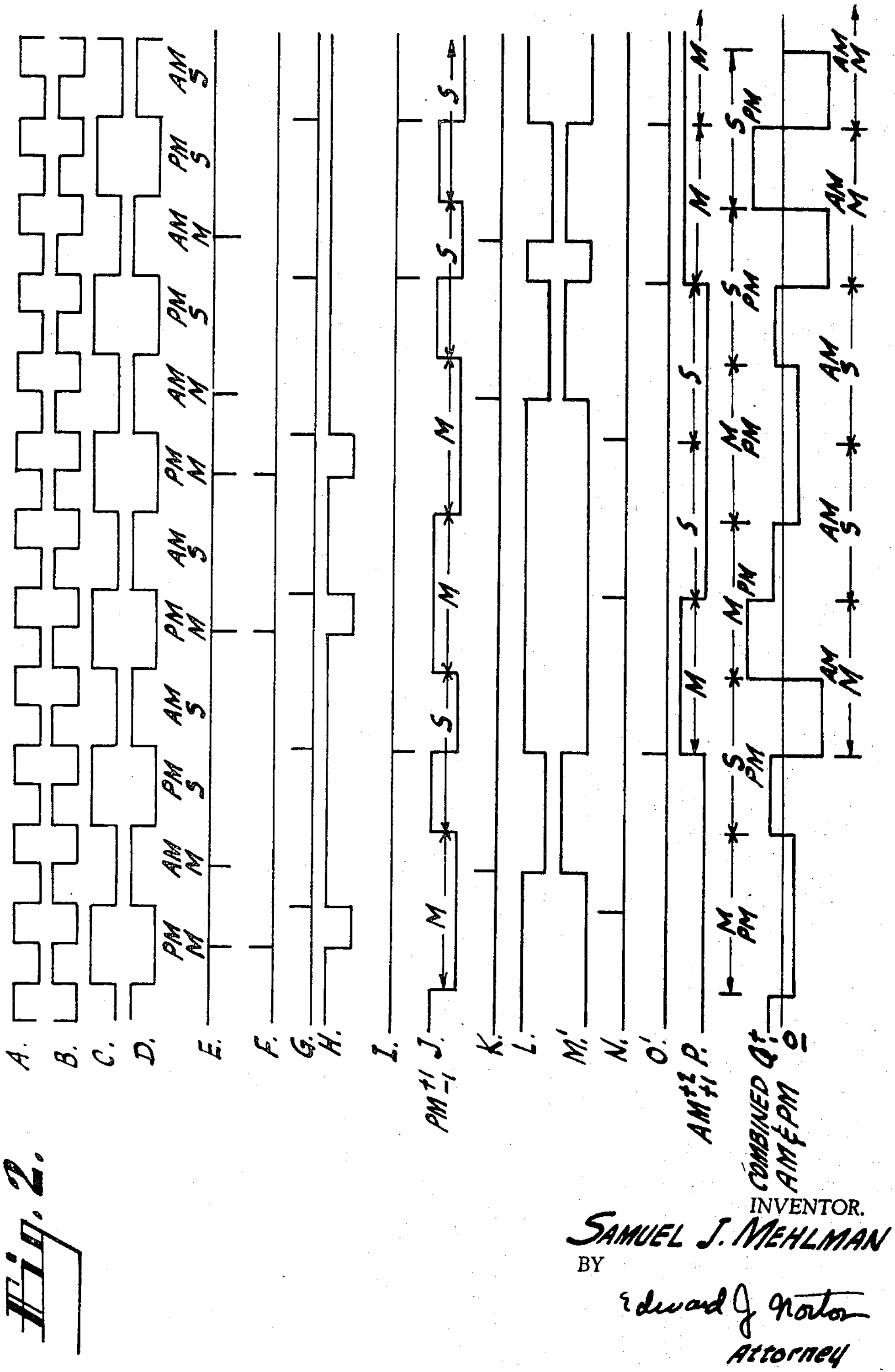
FIG. 2 is a series of wave forms useful in describing the operation of the embodiment shown in FIG. 1.

A suitable transmitter for generating an AM-PM signal in accordance with the invention is shown in FIG. 1, and the wave forms developed therein in a typical operation of the transmitter are shown in FIG. 2. Two types of flip-flop circuits are used in the transmitter of FIG. 1. The first type illustrated as rectangles 15 and 36 reverses the phase of the output signals appearing at its output connections 1 and 0 each time a pulse of the proper polarity is applied to its input (or inputs) T, the waves at the outputs 1 and 0 being of opposite phase at all times.

The second type of flip-flop circuit, illustrated as the rectangles 24, 30 and 32, provides a respective corresponding phase of output responsive to the application of a pulse of a proper polarity to its set or reset input terminals S and R. That is, upon application of a pulse of a proper polarity to its S (or R) input terminal, its 1 and 0 output terminal will exhibit a corresponding opposite phase relation which may be called the "set" (or "reset") relation. Upon application of a second pulse of proper polarity to the same input terminal, the phase of the output terminal will not change from its "set" (or "reset" relation). Upon applying a pulse of the proper polarity to its other terminal R (or S), the output of the flip-flop will exhibit its "set" (or "reset") relation. Both types of flip-flop circuits are similar in that they are insensitive to pulses of improper polarity applied to their various input terminals.

Each And gate 16, 18, 27, 28 and 34 in the transmitter of FIG. 1 provides an output at a given signal level at its output terminal only when pulses of the proper polarity are applied simultaneously to both of the input terminals of the And gate. If less than both the input terminals of an And gate have pulses of the proper polarity applied thereto, the output of that And gate remains at some level other than the given signal level.

A source 13 of information is provided in FIG. 1. This information may be in analogue wave form, and it may be sampled at intervals in accordance with square waves A and B (see FIG. 2) produced by a square wave generator 14. The square waves A and B, which are 180° out-of-phase, are applied to the data source 13 to provide digital information E at the output thereof. The square waves are timed so that there is one baud in curve E of FIG. 2 for each square wave A or B. The bauds of curve E include negative going pulses or marks indicated by M*s* and absences of pulses or spaces indicated by S*s* at the end of each cycle of the wave A or B. The wave A from the generator 14 is also applied to a flip-flop circuit or flip-flop 15 of the first type mentioned above, whereby the flip-flop 15 provides two 180° out-of-phase waves C and D synchronized with the wave A and of ½ the frequency thereof. The wave C appears at the output terminal of the flip-flop 15 marked 1, and the wave D appears at the output terminal thereof marked 0. All the digital information E appearing at the output of the source 13 is applied to one input of both of the two And gates 16 and 18. The wave C is applied to the other input of the And gate 16, while the wave D is applied to the other input of the other And gate 18. Since alternate negative-going voltages are applied to these And gates 16 and 18, the bauds of information E appearing at the output of the source 13 are applied alternately to inverters 20 and 22. Information appearing at the output of the And gate 16 will be considered first.

When the wave C is negative-going, information contained in the even numbered bauds of curve or line E appear at the output of the And gate 16 and in inverted form at the output of inverter 20. The information for the even bauds is represented by curve K of FIG. 2 which indicates the information MSSMMS. This information is applied to the reset input terminal of a flip-flop 24. The wave C from the flip-flop 15 is also applied to a differentiator 26 to provide pulses, curve G. These pulses are applied to the set terminal S of the flip-flop 24 to cause it to provide the output voltage curve L at its 1 output terminal and the output voltage curve M′ at its 0 output terminal. As explained above, if the flip-flop 24 were producing positive-going voltage at its 1 output terminal and negative-going voltage at its 0 output terminal, application of a curve G pulse thereto from the differentiator 26 would have no effect on the flip-flop 24; that is, the flip-flop 24 would continue to produce positive-going voltage at its 1 output terminal and negative-going voltage at its 0 output terminal. However, application of a curve K pulse from the inverter 20 to the reset terminal R of the flip-flop 24 causes a reversal in output; that is, it causes negative-going voltage curve L to appear at its 1 output terminal and positive-going voltage curve M′ to appear at the 0 output terminal. Due to described connection, a curve G pulse is always applied from the differentiator 26 to the flip-flop 24 just before a curve K pulse (if there be one) is applied thereto from the inverter 20, whereby a curve K pulse when it appears always reverses the polarities of the outputs of flip-flop 24. In the absence of a curve K pulse, the outputs, curves L and M′, of the flip-flop 24 are positive-going at the 1 output terminal and negative-going at the 0 output terminal.

The signal condition, curve L appearing at the output terminal 1 of the flip-flop 24 is applied with the pulses of curve G to the respective inputs of an And gate 27. Positive-going pulses, curve N, appear at the output of the And gate 27 when a pulse of curve G is applied from the differentiator 26 to the And gate 27 while the voltage, curve L at the input to the And gate 27 from the flip-flop 24 is positive-going.

The signal condition, curve M′, appearing at the 0 output terminal of the flip-flop 24 is applied, with the pulses of curve G produced at the output of the differentiator 26, to the respective inputs of an And gate 28. Positive-going pulses shown in curve O′ appear at the output of the And gate 28 when the pulses of curve G are applied from the differentiator 26 to the And gate 28 while the signal condition M′ at the output of the flip-flop 24 is positive-going. Pulses as shown in curves N and O′ are applied from the And gates 27, 28 to the set S and to the reset R inputs, respectively, of a flip-flop circuit 30. Each pulse of curve O′ resets the output of the flip-flop circuit 30 so that its output shown in curve P is positive-going, and flip-flop 30 produces a positive-going voltage as long as it is in its reset condition; that is until a pulse of curve N is applied from And gate 2 to the set input S of flip-flop 30 at which time the output of the flip-flop 30 becomes negative going. Application of the pulses of curve O′ from And gate 28 to the flip-flop 30 while the output of flip-flop 30, curve P is positive-going has no effect on this output. Similarly, application of a pulse of curve N from the And gate 27 to the flip-flop 30 while the output of flip-flop 30 is negative-going has no effect on this output. The wave, curve P, appearing at the output of flip-flop 30 is positive-going for even numbered bauds of curve E that represent a mark and is negative-going for even numbered bauds of line E that represent a space. However, the bauds as shown in curve P are twice as long at the bauds shown in curve E and also the bauds of curve P are delayed with respect to curve E by one baud of curve E or by ½ a baud of curve P. The output, curve P, of flip-flop 30 is applied to a modulator 40, which is described further below. As will be explained, the wave shown in curve P controls the amplitude of the output of modulator 40.

As noted above, the first and every odd baud of line E is applied to flip-flop 32 by way of the And gate 18 and the inverter 22. Whenever an odd numbered baud of curve E indicates a mark, a pulse (see curve F of FIG. 2) is applied to the reset input terminal of the flip-flop 32. Whenever an odd numbered baud of curve E represents a space, no pulse is applied to the reset input terminal of flip-flop 32. The pulses applied to the reset input terminal of flip-flop 32 are shown at curve F which represents the information MSMMSS. The pulses of curve G are applied from the differentiator 26 to the set input terminal S of the flip-flop 32; that is, flip-flop 32 provides a positive-going output after each pulse of curve G is applied thereto and until a pulse of curve F is applied thereto, at which time the output of flip-flop 32 becomes negative-going and remains negative-going until the next pulse of curve G is applied to the flip-flop 32, as shown by curve H. Due to the phase relationship of the pulses of curves F and G, the output voltage of the flip-flop 32 is always positive-going whenever a pulse of curve F appears. The voltage at the output of the flip-flop 32 shown in curve H is applied to the And gate 34 along with the pulses of curve G from the differentiator 26. The output pulses of the And gate 34 are applied to an input of the flip-flop 36 of the first type mentioned above through an inverter 38 as shown in curve I. The output square wave shown in curve D of the flip-flop 15 is also applied to an input of the flip-flop 36. Either the negative-going portions of the wave D or the negative-going pulses I cause the flip-flop 36 to reverse the polarity of its output, whatever its polarization may have been at the time that these negative-going signal conditions or pulses are applied to the flip-flop 36. Therefore, the output wave J of flip-flop 36 is a rectangular wave having a cycle length that is twice as long as the bauds of curve E and in which the phase is shifted at the middle of each cycle of curve J for each odd numbered mark of line E. As noted above, line J indicates the information MSMMSS. This wave is also applied to the amplitude modulator 40, and as will be explained, controls the polarity of the output thereof.

In the amplitude modulator 40, the wave of curve J is modulated by the wave of curve P, the wave shown in curve Q appearing at the output of the modulator 40. The lower level of curve P may be considered to be a +1 and the upper level of curve P may be considered to be a +2. Similarly the top level of curve J may be considered to be a +1 and the lower level of curve J may be considered to be a −1. The P and J waves are so combined to produce the wave Q that the first PM information appears at the left hand portion thereof marked PM and the first AM information appears a baud and a half later at the left hand portion thereof marked AM. Bearing this phase relation in mind and also that the curve J controls the polarity of the curve Q and that the curve P controls the amplitude of the curve Q, that is, that the curves J and P are combined in the modulator 40, the curve Q results. It is noted that curve Q represents a signal MSMMSS corresponding to the odd bauds of curve E applied to a carrier wave in phase modulation and to a signal MSSMM corresponding to the even bauds of curve E (the final S being beyond the illustrated end of the curve Q), applied to a wave in amplitude modulation, delayed however by a baud and ½ of the wave Q.

It will also be noted that, due to this delay of an odd number of half bauds, all amplitude modulation is applied equally and in opposite directions to the last half of a phase modulated baud and to the first half of the next phase modulated baud. Therefore, the amplitude modulation applied to the phase modulated wave does not vary the average or displace the zero line of the wave carrying combined AM-PM modulation. This is due to the fact that the last half of a PM modulated wave baud interval and of the first half of the next PM modulated wave baud interval are always out-of-phase. This wave Q can be applied directly to a transmission channel having a band width which will eliminate the high frequencies therefrom whereby a wave such as wave 1 of FIG. 4 arrives at the receiver of FIG. 3.

Figure 3:
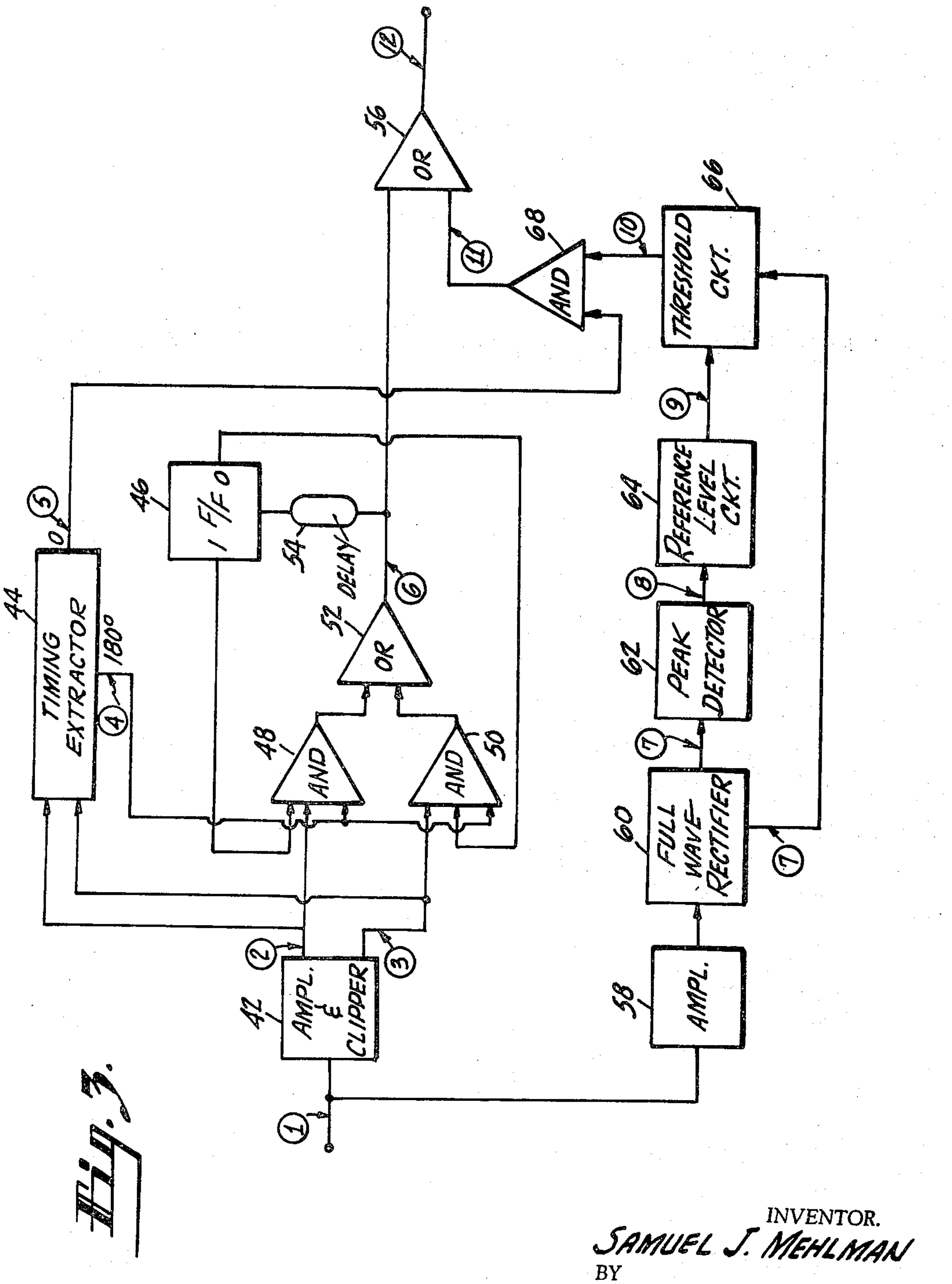
FIG. 3 is a block diagram of one embodiment of a receiver or demodulator of this invention.
Figure 4:
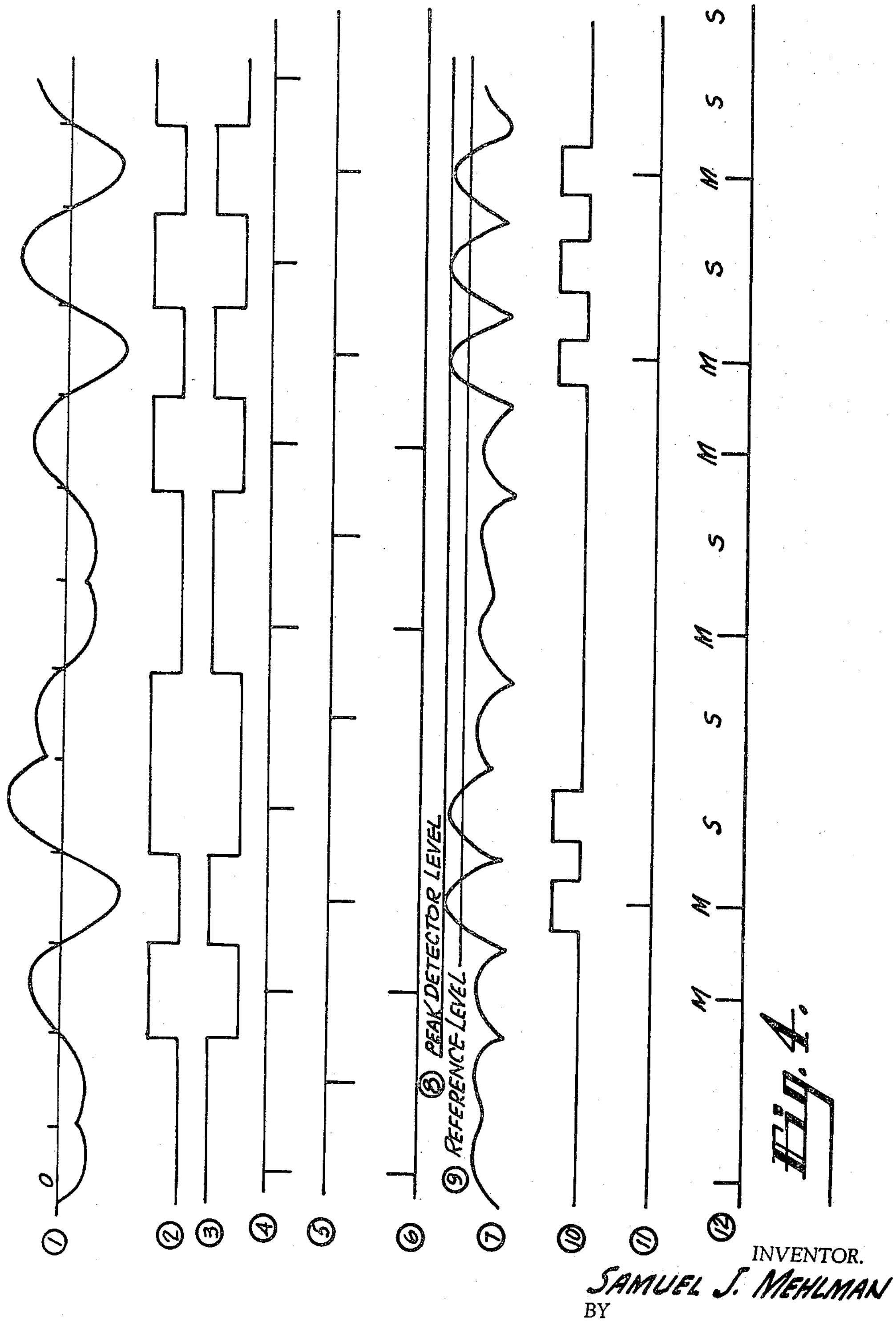
FIG. 4 is a series of wave forms useful in describing the operation of the embodiment shown in FIG. 3.

The wave 1 of FIG. 4 is applied to an amplifier and clipper 42 comprising a part of the receiver of FIG. 3. The amplifier and clipper 42 has two out-of-phase outputs 2 and 3. These outputs are of substantially constant amplitude; that is, the amplitude modulation of the applied wave is removed and waves 2 and 3 represent only the phase modulation. These two waves 2 and 3, from the amplifier and clipper 42 are applied to the two inputs of a timing extractor 44. The timing extractor 44 provides equally spaced pulses shown in curves 5 and 4 of FIG. 4 from its outputs marked 0 and 180°, respectively. The pulses included in curves 4 and 5 are each spaced by a cycle of waves C or D of FIG. 2, and they are 180° out-of-phase with respect to each other. The wave 4 from the timing extractor 44 and the wave 2 from the amplifier and clipper 42, as well as the wave from the 1 output terminal of a flip-flop 46, which is of the first type mentioned above, are applied to the input terminals of an And gate 48. The wave 4 from the timing extractor 44 and the wave 3 from the amplifier and clipper 42 as well as a wave from the 0 output terminal of the flip-flop 46 (which is 180° out-of-phase with the wave applied thereby to the And gate 48) are applied to an And gate 50. The outputs of the And gates 48 and 50 are applied to an Or gate 52. The output wave 6 of the Or circuit 52 is applied through a delay circuit 54 to the input of the flip-flop 46. There is an output from the And gate 48 only when the wave 2, the wave 4 and the wave from flip-flop 46 applied thereto are simultaneously negative-going. Similarly there is an output from the And gate 50 only when the wave 3 and the wave 4 and the wave applied thereto from flip-flop 46 are simultaneously negative-going. There is an output from the Or gate 52 whenever there is any input thereto. The delay provided by the delay circuit 54 is greater than the width of the pulses of curve 4 of FIG. 4 and shorter than the time between the pulses of curves 4 and 5. The delay circuit 54 acts to prevent the flip-flop 46 from changing its state too fast and thereby making the output curve 6 of Or gate 52 too narrow. The pulses of curve 6 appearing at the output of the Or gate 52 are also applied to one of the inputs of an Or gate 56. These pulses 6 correspond to the odd numbered pulses of curve E or the pulse of curve F in FIG. 2 delayed by the time between two pulses of curve 4 of FIG. 4 as will be noted by comparing the odd numbered bauds of curve E or the curve F of FIG. 2 with the second and successive signals of curve 6 of FIG. 4.

The input wave 1 is also applied to an amplifier 58 and thence to a full wave rectifier 60 which provides two full wave outputs such as wave 7 of FIG. 4. One wave 7 from the full wave rectifier 60 is applied to a peak detector 62 and thence to a reference level circuit 64. The peak detector 62 determines the level of the peaks of wave 7 as indicated by the line 8 of FIG. 4, and the reference level circuit 64 produces an output voltage shown in curve 9 which differs from the peak load 8 by an amount less than the voltage added to the peaks of wave 1 by amplitude modulation thereof as described in connection with FIGS. 1 and 2. The signal condition of curve 9 is applied from the reference level circuit 64 to a threshold circuit 66 to which wave 7 is also applied. Threshold circuit 66 passes only those parts of the wave 7 which exceed the reference level voltage 9 and provides square waves such as shown at curve 10 of FIG. 4 for those portions of the wave 7 that exceed the reference level 9. The square waves shown in curve 10 contain the amplitude modulation components of the received wave 1, there being two pulses in curve 10 for each pulse of curve N of FIG. 2, due to the doubling of peaks provided by the full wave rectifier 60.

The output wave 10 of the threshold circuit 66 and the timing pulses shown in curve 5 at the 0 output terminal of the timing extractor 44 are applied to an And gate 68 whereby, whenever a negative-going pulse of curve 5 and a positive-going pulse of curve 10 coincide in time, a pulse shown in curve 11 appears at the output of the And circuit 68 whereby one of the doubled peaks is selected and appears at curve 11. Each pulse of curve 11 of FIG. 4 corresponds to the even numbered signals of curve E of FIG. 2, but reversed in phase and delayed two bauds of curve E and also of curve K of FIG. 2. The Or gate 56 merely combines the pulses of wave 6 and the pulses of wave 11 to provide the output pulses shown in curve or wave 12 of FIG. 4, which is a reverse phase replica of the pulses of curve E of FIG. 2, delayed however by two bauds of curve E.

Turning again to FIGS. 1 and 3, the pieces of equipment indicated by the several rectangles are conventional. The operation of the And and Or gates and the flip-flops has been described above. The data source 13 of FIG. 1 may be any means to produce an analogue wave carrying information to be transmitted and including a means for sampling both the positive and negative excursions of the wave by applying opposite phase input waves A and B thereto. Output pulses are provided only if the amplitude of the analogue wave is greater than a predetermined amount when sampled and the output waves are always in one polarity. The timing extractor 44 of FIG. 3 may include a phase locked oscillator, having a slightly longer period of time than two bauds of curve E of FIG. 2, which is synchronized by applying the square pulses shown in curves 2 and 3 of FIG. 4 thereto, the vertical edges of the pulse of curves 2 and 3 of proper polarities acting as synchronizing pulses. The reference level circuit 64 can be, for example, a reversely biased diode, the reverse bias being equal to the difference in level of curves 8 and 9 of FIG. 4. The threshold circuit 66 can be a reversely biased diode to which the voltage from reference level circuit 64 is applied as the reverse bias, the signal of curve 7 being applied across this last mentioned reversed bias diode.

Although only a single AM/PM transmitter and receiver has been described, it will undoubtedly be apparent to those skilled in the art that variations thereof are possible within the spirit of the present invention. Hence, it should be understood that the foregoing description is to be considered as illustrative and not in a limiting sense.

What is claimed is:

1. In combination:

means for phase modulating according to a first signal a given wave by causing the phase of said wave to be reversed in the middle of a cycle for one signal condition and to continue without phase reversal during a cycle for a second signal condition, and means for amplitude modulating according to a second signal the periods of said phase modulated wave corresponding to the last half of a cycle and the first half of the next succeeding cycle of said phase modulated wave.

2. In combination:

means for phase modulating according to a first signal a given wave by causing the phase of said wave to be reversed in the middle of a cycle for one signal condition and to continue without phase reversal during a cycle for a second signal condition, means for amplitude modulating according to a second signal said given wave, and means for combining said phase and amplitude modulated waves to form a doubly modulated wave in which the difference in phase of said phase modulation and of said amplitude modulation of said given wave is an odd number of half cycles.

3. Apparatus for phase modulating each cycle of a given wave in accordance with a signal, said signal comprising a pulse occurring during certain cycles of said given wave indicating marks and the absence of pulses occurring during others of said cycles indicating spaces, and for amplitude modulating said wave without varying the average axis thereof due to said amplitude modulation comprising:

a first flip-flop circuit having a set and a reset input terminal and a pair of output terminals, said output terminals exhibiting a first opposite phase relation of output voltages upon application of a pulse to said set terminal and a reversed output phase relation of output voltages upon the application of a pulse to said reset terminal, a source of timing signals having the frequency of said given wave connected to said set input terminal to cause the output terminals of said flip-flop circuit to exhibit said first opposite phase relation of voltage, means for applying mark signals to said reset input terminal to cause said flip-flop circuit to exhibit said reversed opposite phase relation of output voltages in response to the occurrence of a mark signal, and And gate having two input terminals and an output terminal, means for applying said timing signal to one input of said And gate, means for applying an output appearing at an output terminal of said flip-flop circuit to another input terminal of said And gate, a second flip-flop circuit having input and output terminals, the phase voltage appearing at the output terminals of said second flip-flop circuit reversing upon application of a pulse to the input terminals of said second flip-flop circuit, means for applying the output of said And gate to an input terminal of said second flip-flop circuit, means for applying said given wave to an input terminal of said second flip-flop, whereby a phase modulated wave appears at an output terminal of said second flip-flop circuit in which the phase of the wave is reversed in the middle of a cycle in response to the occurrence of said mark signal and in which the wave continues without phase reversal in response to the absence of said mark signal, and means for amplitude modulating the periods of said phase modulated wave corresponding to the last half of a cycle of said phase modulated wave and the first half of the next succeeding cycle of said phase modulated wave in accordance with a second signal.

4. Apparatus for phase modulating each cycle of a given wave in accordance with a signal, said signal comprising a pulse occurring during certain cycles of said given wave indicating marks and the absence of pulses occurring during others of said cycles indicating spaces, and for amplitude modulating said wave without varying the average axis thereof due to said amplitude modulation comprising:

a first and a second flip-flop circuit each having a set and a reset terminal and a pair of output terminals, said output terminals exhibiting a first opposite phase relation of output voltages upon application of a pulse to said set terminal and a reversed output phase relation of output voltage upon the application of a pulse to its said reset terminal, a source of timing signals having the frequency of said given wave connected to said set input terminal of said first flip-flop circuit to cause the output terminals of said first flip-flop circuit to exhibit said first opposite phase relation of voltages, means for applying mark signals to said reset input terminal of said first flip-flop circuit to cause said first flip-flop circuit to exhibit said reversed opposite phase relation of output voltages in response to the occurrence of a mark signal, a plurality of And gates each having two input terminals and an output terminal, means for applying said timing signal to one input of each of said And gates, means for applying the two outputs appearing at said output terminal of said first flip-flop circuit respectively to the other input terminals of said And gates, means for applying the outputs of said And gates respectively to the set and reset terminals of said second flip-flop circuit, whereby an amplitude modulated wave appears at an output terminal of said second flip-flop circuit in which the amplitude of the wave is at one level in response to the absence of a mark signal and at a different level in response to the occurrence of a mark signal, means for phase modulating each cycle of said given wave, and means for intermodulating said amplitude modulated wave and said phase modulated wave to form a doubly modulated wave in which the difference in phase of said phase modulation and of said amplitude modulation of said given wave is an odd number of half cycles.

5. Apparatus for phase modulating each cycle of a given wave in accordance with a signal, said signal comprising a pulse occurring during certain cycles of said given wave indicating marks and the absence of pulses occurring during others of said cycles indicating spaces, and for amplitude modulating said wave without varying the average axis thereof due to said amplitude modulation comprising:

means for providing a succession of mark and space signals at a rate equal to twice the frequency of said given wave, means for separating said successive signals into two groups of signals, a first and a second flip-flop circuit each having a set and a reset terminal and a pair of output terminals, said output terminals of each of said flip-flop circuits exhibiting a first opposite phase relation of output voltages upon application of a pulse to said set terminal and a reversed opposite phase relation of output voltages upon application of a pulse to said reset terminal, a source of timing signals providing one pulse for each cycle of said given wave, means for applying said timing signals to said set terminal of said first flip-flop circuit to cause the output terminals of said first flip-flop circuit to exhibit said first opposite phase relation of voltage, means for applying mark signals of one group of mark and space signals to said reset input terminal of said first flip-flop circuit to cause said first flip-flop circuit to exhibit said reversed opposite phase relation of said output voltages in response to the occurrence of a mark signal, a plurality of And gates each having two input terminals and an output terminal, means for applying said timing signals to one input of each of said And gates, means for applying the two outputs appearing at said output terminals of said first flip-flop circuit respectively to the other input terminals of said And gates, means for applying the outputs of said And gates respectively to the set and reset terminals of said second flip-flop circuit, whereby an amplitude modulated wave appears at an output terminal of said second flip-flop circuit in which the amplitude of the modulated wave assumes one level in response to the occurrence of a mark in said first group of marks and spaces, and in which the wave assumes another level in response to the occurrence of a space in said first group, means for phase modulating cycles of said given wave in response to the occurrence of marks in said second group of marks and spaces, and means for intermodulating said amplitude and said phase modulated wave to form a doubly modulated wave in which the difference in phase of said phase modulation and of said amplitude modulation of said given wave is an odd number of half cycles.

6. Apparatus for phase modulating each cycle of a given wave in accordance with a signal, said signal comprising a pulse during certain cycles of said given wave indicating marks and the absence of pulses occurring during others of said cycles indicating spaces, and for amplitude modulating said wave without varying the average axis thereof due to said amplitude modulation comprising:

means for providing a succession of mark and space signals at a rate equal to twice the frequency of said given wave, means for separating said successive signals into two groups of signals, a flip-flop circuit having a set and a reset terminal and a pair of output terminals, said output terminals exhibiting a first opposite phase relation of output voltages upon application of a pulse to said set terminal and a reversed opposite phase relation of output voltages upon application of a pulse to said reset terminal, a source of timing signals providing one pulse for each cycle of said given wave, means for applying said timing signals to said set terminal of said flip-flop circuit to cause the output terminals of said flip-flop circuit to exhibit said first opposite phase relation of voltages, mean for applying said mark signals of one group of mark and space signals to said reset input terminals of said flip-flop circuit to cause said flip-flop circuit to exhibit said reversed opposite phase relation of said output voltages in response to the occurrence of a mark signal, an And gate having two input terminals and an output terminal, means for applying said timing signals to one input of said And gate, means for applying an output appearing at an output terminal of said flip-flop circuit to the other input terminal of said And gate, a second flip-flop circuit having input and output terminals, the phase of voltages appearing on said output terminal reversing upon application of a pulse to an input terminal thereof, a means for applying the output of said And gate to an input terminal of said second flip-flop circuit, means for applying said given wave to an input terminal of said second flip-flop circuit, whereby a phase modulating wave appears at an output terminal of said second flip-flop circuit in which the phase of the phase modulated wave is reversed in the middle of a cycle thereof in response to the occurrence of a mark in said first group of marks and spaces, and in which the wave continues without phase reversal in response to the occurrence of a space in said first group, and means for amplitude modulating the periods of said phase modulated wave corresponding to the last half of a cycle and the first half of the next succeeding cycle of said phase modulated wave according to said second group of marks and spaces.

7. Apparatus for phase modulating each cycle of a given wave in accordance with a signal, said signal comprising a pulse occurring during certain cycles of said given wave indicating marks and the absence of pulses occurring during others of said cycles indicating spaces, and for amplitude modulating said wave without varying the average axis thereof due to said amplitude modulation comprising:

means for providing a succession of mark and space signals at a rate equal to twice the frequency of said given wave, means for separating said successive signals into two groups of signals, a first, a second and a third flip-flop circuit each having a set and reset terminal and a pair of output terminals, said output terminals of each of said flip-flop circuits exhibiting a first opposite phase relation of output voltages upon application of a pulse to said set terminal and a reversed opposite phase relation of output voltages upon application of a pulse to said reset terminal, a source of timing signals providing one pulse for each cycle of said given wave, means for connecting said source of timing signals to said set input terminal of said first flip-flop circuit to cause the output terminals of said first flip-flop circuit to exhibit said first opposite phase relation of voltages, means for applying mark signals of one of said groups thereof to said reset input terminal of said first flip-flop circuit to cause said first flip-flop circuit to exhibit said reversed output phase relations of said output voltages in response to the occurrence of a mark signal, three And gates each having two input terminals and an output terminal, means for applying said timing signals to one input of each of said And gates, means for applying the two outputs appearing at said output terminals of said first flip-flop circuit respectively to the other input terminals of two of said And gates, means for applying the outputs of said two And gates respectively to the set and reset terminals of said second flip-flop circuit, whereby an amplitude modulated wave appears at an output terminal of said second flip-flop circuit in which the amplitude modulated wave assumes one amplitude in response to the occurrence of a mark in said first group of marks and spaces and in which the amplitude modulated wave assumes another amplitude in response to the occurrence of a space in said first group, a modulator having two input terminals and an output terminal, means for applying said amplitude modulated wave to one input terminal of said modulator, means for applying said timing pulses to said set input terminal of said third flip-flop circuit, means to apply said second group of signals to said reset terminal of said third flip-flop circuit, means for applying one of the outputs of said third flip-flop circuit to the second input of said third And gate circuit, a fourth flip-flop circuit having input and output terminals, the application of a voltage to an input terminal reversing the phase of the voltage at the output terminals thereof, means for applying the output of said third And gate to an input of said fourth flip-flop circuit, means for applying said given wave to the other input of said fourth flip-flop circuit, whereby a phase modulated wave appears at the output of said fourth flip-flop circuit in which the phase of said given wave is reversed at the middle of a cycle in response to a mark in said second group of marks and spaces and in which said given wave continues without change in phase in response to a space of said second group of marks and spaces, and means to apply the output of said fourth flip-flop circuit to the other input of said modulator whereby a phase and an amplitude modulated waves appears at the output of said modulator.

8. Apparatus for phase modulating each cycle of a given wave in accordance with a signal, said signal comprising a pulse occuring during certain cycles of said given wave indicating marks and the absence of pulses occurring during others of said cycles indicating spaces, and for amplitude modulating said wave without varying the average axis thereof due to said amplitude modulation comprising:

means for providing a succession of mark and space signals at a rate equal to twice the frequency of said given wave, means for separating said successive signals into two groups of signals comprising a first pair of And gates each having a pair of input terminals and an output terminal, means for applying said signals to one input terminal of each And gate, means for applying said given wave as a first phase to the second input terminal of one And gate and at a reversed phase to the other input terminal of said second And gate circuit, a group of signals appearing at the output of each of said first pair of And gates, a first, a second and a third flip-flop circuit each having a set and a reset terminal and a pair of output terminals, said output terminals of each of said flip-flop circuits exhibiting a first opposite phase relation of output voltages upon application of a pulse to said set terminal and a reversed opposite phase relation of output voltages upon application of a pulse to said reset terminal, a source of timing signals having the frequency of said given wave connected to said set input terminal of said first flip-flop circuit to cause the output terminals of said first flip-flop circuit to exhibit said first opposite phase relation of voltages, means for applying said mark signals of one group thereof at the output of one of said first pair of And gates to said reset input terminal of said first flip-flop circuit to cause said first flip-flop circuit to exhibit said reversed output phase relations of said output voltages in response to the occurrence of a mark signal, a second plurality of And gates each having two input terminals and an output terminal, means for applying said timing signals to one input of each of said second plurality of And gates, means for applying the two outputs appearing at said output terminals of said first flip-flop circuit respectively to the other input terminals of two of said second plurality of And gates, means for applying the outputs of said last-mentioned two And gates respectively to the set and reset terminals of said second flip-flop circuit, whereby an amplitude modulated wave appears at an output terminal of said second flip-flop circuit in which the amplitude of the amplitude modulated wave assumes one amplitude in response to the occurrence of a mark in said first group of marks and spaces and in which the wave assumes another amplitude in response to the occurrence of a space in said first group, a modulator having two input terminals and an output terminal, means for applying said amplitude modulated wave to one input terminal of said modulator, means for applying said timing signals to the said set input terminal of said third flip-flop circuit, means for applying said second group of marks and spaces at the output of the other of said first pair of And gates to the reset terminal of said third flip-flop circuit, means for applying one of the outputs of said third flip-flop circuit to the second input of a third And gate circuit of said second plurality thereof, a fourth flip-flop circuit having input and output terminals, the application of a voltage to an input terminal reversing the phase of the voltage at the output thereof, means for applying the output of said third And gate to one input of said fourth flip-flop circuit, means for applying said given wave to an input of said fourth flip-flop circuit, whereby a phase modulated wave appears at the output of said fourth flip-flop circuit in which the phase of the wave reverses in the middle of the cycle in response to a mark in said second group of marks and spaces and in which the wave continues without change of phase in response to a space of said second group of marks and spaces, and means to apply the output of said fourth flip-flop circuit to the other input of said modulator whereby a phase and an amplitude modulated wave appears at the output of said modulator.

9. A system for producing doubly modulated waves comprising:

a generator for producing waves at a reference frequency, a source of analogue information, means responsive to reference waves from said generator to produce a succession of mark and space signals from said analogue wave, said mark signals comprising pulses produced responsive to said analogue wave attaining a predetermined amplitude in either direction from zero during the interval of a cycle of said reference wave and said space signals comprising the absence of pulses during the interval of another cycle of said reference wave during which said analogue signal does not attain said predetermined amplitude, means for separating said successive signals into two groups of signals, a first and a second flip-flop circuit each having a set and a reset terminal and a pair of output terminals, said output terminals exhibiting a first opposite phase relation of output voltages upon application of a pulse to said set terminal and a reversed opposite phase relation of output voltages upon application of a pulse to said reset terminal, a source of given waves at half the frequency of said reference waves, a source of timing signals providing one pulse for each cycle of said given waves, means for applying said timing signals to said set terminal of said first flip-flop circuit to cause the output terminals of said first flip-flop circuit to exhibit said first opposite phase relation of voltage, means for applying said mark signals of one group of mark and space signals to said reset input terminal of said first flip-flop circuit to cause said first flip-flop circuit to exhibit said reversed opposite phase relation of said output voltages in response to the occurrence of a mark signal, a plurality of And gates each having two input terminals and an output terminal, means for applying said timing signals to one input of each of said And gates, means for applying the two outputs appearing at said output terminals of said first flip-flop circuit respectively to the other input terminals of said And gates, means for applying the outputs of said And gates respectively to the two inputs of said second flip-flop circuit whereby an amplitude modulated wave appears at an output terminal of said second flip-flop circuit, in which the amplitude of the amplitude modluated wave assumes one level in response to the occurrence of a mark in said first group of marks and spaces, and in which the wave assumes another level in response to the occurrence of a space in said first group, and means for phase modulating the cycles of said amplitude modulated wave according to the occurrence of a mark in said second group of marks and spaces.

10. In a system for producing doubly modulated waves comprising:

a generator for producing waves at a reference frequency, a source of analogue information, means including said generator to produce a succession of mark and space signals from said analogue wave, said mark signals comprising pulses responsive to said analogue wave attaining a predetermined amplitude in either direction from zero during the interval of a cycle of said reference wave and said space signals comprising the absence of pulses during the interval of another cycle of said reference wave during which said analogue signal does not attain said predetermined amplitude, means for separating said successive signals into two groups of signals, a first flip-flop circuit having a set and a reset terminal and a pair of output terminals, said output terminals exhibiting a first opposite phase relation of output voltages upon application of a pulse to said set terminal and a reversed opposite phase relation of output voltages upon application of a pulse to said reset terminal, a source of given waves at half the frequency of said reference waves, a source of timing signals providing one pulse for each cycle of said given waves, means for applying said timing signals to said set terminal of said flip-flop circuit to cause the output terminals of said flip-flop circuit to exhibit said first opposite phase relation of voltages, means for applying said mark signals of one of said groups of mark and space signals to said reset input terminal of said flip-flop circuit to cause said flip-flop circuit to exhibit said reversed opposite phase relation of said output voltages in response to the occurrence of a mark signal, an And gate having two input terminals and an output terminal, means for applying said timing signals to one input of said And gate, means for applying the output appearing at one output terminal of said flip-flop circuit to the other input terminal of said And gate, a second flip-flop circuit exhibiting reversed phase of output responsive to application of a pulse to an input thereof, means for applying the output of said And gate to an input of said second flip-flop circuit, means to apply said given wave to an input of said second flip-flop circuit whereby a phase modulated wave appears at an output terminal of said second flip-flop circuit in which the phase of the phase modulated wave is reversed in the middle of a cycle thereof in response to the occurrence of a mark in said one group of marks and spaces, and in which the wave continues without phase reversal in response to the occurrence of a space in said one group, and means for amplitude modulating the periods of said phase modulated wave corresponding to the last half of a cycle of said phase modulated wave and the first half of the next succeeding cycle of said phase modulated wave in response to the occurrence of a mark in said second group of marks and spaces.

11. Means for demodulating a wave the successive cycles of which are phase modulated in accordance with marks and spaces and in which periods corresponding to the last half of a cycle and the first half of the next succeeding cycle are amplitude modulated in accordance with other marks and spaces comprising:

means responsive to said wave to be demodulated for providing two 180° out-of-phase square waves, a timing extractor having two input terminals and two output terminals, means to apply said square waves to the respective input terminals of said timing extractor for producing alternately appearing timing pulses at the two output terminals thereof, a pair of And gates each having three input terminals, means for applying the timing pulses appearing at one of said output terminals to respective first input terminals of said And gates, means for applying said square waves respectively to second input terminals of said And gates, an Or gate having two input terminals and one output terminal, means for applying the outputs of said And gates respectively to the two inputs of said Or gate, a flip-flop circuit having one input terminal and two output terminals, the voltage appearing at said output terminals always being out-of-phase and the phase relationship therebetween reversing in response to a pulse applied to the input terminal of said flip-flop circuit, means including a delay device for applying the output of said Or gate to the input terminal of said flip-flop circuit, respective connections between the output terminals of said flip-flop circuit and the third input terminals of said And gates, whereby the phase modulation information included in said wave to be demodulated appears at the output of said Or gate, means for full wave rectifying said wave to be demodulated, means for passing the peaks of said full rectified wave above a predetermined reference level, an And gate having two input terminals and an output terminal, and means for applying the passed peaks and the timing pulses appearing at the second output terminal of said timing extractor respectively to the input terminals of said last named And gate, whereby the amplitude modulation information included in said wave to be demodulated appears at the output of said last named And gate.

12. Means for demodulating a wave the successive cycles of which are phase modulated in accordance with both mark and space signals comprising:

means responsive to said wave to be demodulated for providing two 180° out of phase square waves, a timing extractor having two input terminals and two output terminals, means to apply said square waves to the respective input terminals of said timing extractor for producing alternately appearing timing pulses at the two output terminals thereof, a pair of And gates each having three input terminals, means for applying the timing pulses appearing at one of said output terminals to respective first input terminals of said And gates, means for applying said square waves respectively to second input terminals of said And gates, an Or gate having two input terminals and one output terminal, means for applying the outputs of said And gates respectively to the two inputs of said Or gate, a flip-flop circuit having one input terminal and two output terminals, the voltage appearing at said output terminals always being out of phase and the phase relationship therebetween reversing in response to a pulse applied to the input terminal of said flip-flop circuit, means including a delay device for applying the output of said Or gate to the input terminal of said flip-flop circuit, respective connections between the output terminals of said flip-flop circuit and the third input terminal of said And gates, whereby the phase modulation signals applied to said wave to be demodulated appears at the output of said Or gate.

13. Means for demodulating a wave the successive cycles of which are phase modulated in accordance with mark and space signals and in which the periods corresponding to the last half of a cycle and the first half of the next succeeding cycle are amplitude modulated in accordance with other mark and space signals comprising:

means responsive to said wave to be demodulated for providing two 180° out-of-phase square waves, a timing extractor having two input terminals and two output terminals, means to apply said square waves to the respective input terminals of said timing extractor for producing alternately appearing timing pulses at the two output terminals thereof, a pair of gates each having three input terminals, means for applying the timing pulses appearing at one of said output terminals to respective first input terminals of said And gates, means for applying said square waves respectively to second input terminals of said And gates, an Or gate having two input terminals and one output terminal, means for applying the outputs of said And gates respectively to the two inputs of said Or gate, a flip-flop circuit having one input terminal and two output terminals, the voltage appearing at said output terminals always being out-of-phase, and the phase relationship therebetween reversing in response to a pulse applied to the input terminal of said flip-flop circuit, means including a delay device for applying the output of said Or gate to the input terminal of said flip-flop circuit, respective connections between the output terminals of said flip-flop circuit and the third input terminals of said And gates, whereby the signals carried by said wave to be demodulated as phase modulation appears at the output of said Or gate, means for full wave rectifying said wave to be demodulated, means for passing the peaks of said full rectified wave above a predetermined reference level, an And gate having two input terminals and an output terminal, means for applying the passed peaks and the timing pulses appearing at the second output terminal of said timing extractor respectively to the input terminals of said last named And gate, whereby the signals carried by said wave to be demodulated as amplitude modulation appear at the output of said last named And gate, means for combining said phase and said amplitude modulated signals including an Or gate having two inputs and one output, and means for applying said phase modulation signal and said amplitude modulation signal to the respective inputs of said last named Or gate.

14. Apparatus for phase modulating each cycle of a given wave in accordance with a signal said signal comprising a pulse occurring during certain cycles of said given wave indicating marks and the absence of pulses occurring during others of said cycles indicating spaces, for amplitude modulating said wave without varying the average axis thereof due to said amplitude modulation to produce a doubly modulated wave, and for demodulating said doubly modulated wave, said modulator comprising:

a first flip-flop circuit having a set and a reset terminal and a pair of output terminals, said output terminals exhibiting a first opposite phase relation of output voltages upon application of a pulse to said set terminal and a reversed output phase relation of output voltage upon the application of a pulse to said reset terminal, a source of timing signals of the frequency of said given wave connected to said set input terminal of said flip-flop circuit to cause the output terminals of said flip-flop circuit to exhibit said first opposite phase relation of voltages, means for applying mark signals to said reset input terminal of said flip-flop circuit to cause said flip-flop circuit to exhibit said reversed opposite phase relation of output voltages in response to the occurrence of a mark signal, a first And gate having two input terminals and an output terminal, means for applying said timing signal to one input of said And gate, means for applying the output appearing at an output terminal of said flip-flop circuit to the other input terminal of said And gate, a second flip-flop circuit having input and output terminals, the voltage of said output terminals of said second flip-flop reversing in phase upon application of a pulse to an input terminal, means for applying the output of said And gate to an input terminal of said second flip-flop circuit, means for applying said given wave to an input terminal of said second flip-flop circuit whereby a phase modulated wave appears at an output terminal of said second flip-flop circuit in which the phase of the wave is reversed in the middle of a cycle in response to the occurrence of a mark and in which the wave continues without phase reversal in response to the occurrence of a space, means for amplitude modulating the periods of said phase modulated wave corresponding to the last half of a cycle and the first half of the next succeeding cycle of said phase modulated wave according to the mark and spaces of a second signal to produce said doubly modulated wave, said demodulator comprising:

means responsive to said doubly modulated wave for providing two 180° out of phase square waves, a timing extractor having two input terminals and two output terminals, means to apply said square waves to the respective input terminals of said timing extractor for producing alternately appearing timing pulses at the two output terminals thereof, a pair of And gates each having three input terminals, means for applying the timing pulses appearing at one of said output terminals to respective first input terminals of said pair of And gates, means for applying said square waves respectively to second input terminals of said pair of And gates, an Or gate having two input terminals and one output terminal, means for applying the outputs of said pair of And gates respectively to the two inputs of said Or gate, a flip-flop circuit having an input terminal and two output terminals, the voltages appearing at said output terminals always being out of phase, and the phase relationship therebetween reversing in response to a pulse applied to an input terminal of said flip-flop circuit, means including a delay device for applying the output of said Or gate to the input terminal of said last-named flip-flop circuit, respective connections between the output terminals of said last-mentioned flip-flop circuit and the third input terminals of said pair of And gates, whereby said mark and space signals applied to said wave to be demodulated as phase modulation appear at the output of said Or gate, means for full wave rectifying said doubly modulated wave to be demodulated, means for passing the peaks of said full rectified wave above a predetermined reference level, a further And gate having two input terminals and an output terminal, means for applying the passed peaks and the timing pulses appearing at the second output of said timing extractor respectively to the input terminals of said further And gate, whereby said mark and space signals applied to said wave to be demodulated as amplitude modulation appear at the output of said further And gate, means for combining said phase and said amplitude modulation signals including a further Or gate having two inputs and one output, and means for applying said phase modulation signals and said amplitude modulation signals to the respective inputs of said further Or gate.

15. A modulator for phase and amplitude modulating a carrier wave comprising:

means for phase modulating a cycle of said wave by reversing the phase of one-half cycle of said wave for one signal condition and for continuing the wave without phase reversal during a cycle for a second signal condition, and means for amplitude modulating said phase modulated wave in accordance with a second signal while maintaining a substantially zero average direct current level of said wave.

References Cited

UNITED STATES PATENTS

| | | | |
|---|---|---|---|
| 2,611,826 | 9/1952 | Kalfaian | 332—17 X |
| 2,987,683 | 6/1961 | Powers | 332—41 X |
| 3,160,812 | 12/1964 | Scantlin | 325—139 X |

ROBERT L. GRIFFIN, *Primary Examiner.*

J. T. STRATMAN, *Assistant Examiner.*